DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 5, 1974

928 O.G. 8

T928,006

SILENCERS

Victor Jeffrey Leslie, Potters Bar, England, assignor to Imperial Chemical Industries Limited, London, England

Filed Dec. 17, 1973, Ser. No. 425,276

Claims priority, application Great Britain, Jan. 26, 1973, 4,125/73

Int. Cl. B44d *1/36*

U.S. Cl. 117—97

No Drawing. 6 Pages Specification

Silencers or mufflers for internal combustion engines are disclosed having at least one surface and preferably both the internal and external surfaces, coated with a polyarylene polyether containing aromatic ether or thioether groups in the polymer chain *ortho* or *para* to at least one —$SO_2$— or —CO— group. Thermoplastic polyarylene polyethers useful herein generally have at least some units of the structure:

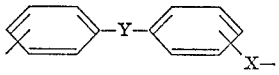

in which *y* is oxygen or sulfur or the residue of an aromatic diol such as 4,4′-bisphenol. These polymers are resistant to road salt, slush and road water and protect the underlying metal substrate even at temperatures above 200° C.

The polyarylene polyether coating is preferably applied to the silencer or muffler after the article is fabricated as welding operations destroy the integrity of the polymer coating. The polymer is applied using conventional dipping, spraying, brushing or powder coating techniques and are preferably contained in a solvent solution.

Suitable solutions for coating polyarylene polyether contain 5 to 25 g. by weight of polymer in 100 ml. of solution (i.e. 5 to 25% w./v.) preferably 10–15% w./v. Suitable solvents include alkyl and aryl sulphones and sulphoxides, amides such as for example dimethylformamide, ketones such as for example cyclohexanone. The solvent or mixture of solvents used will depend on various factors such as solution pot-life required, ventilation and solvent evaporation facility available. A particularly preferred solvent mixture for optimum shelf life of the coating solution consists of cyclohexanone (15 to 20 parts by volume preferably about 18 parts), methyl ethyl ketone (4 to 7 parts preferably 5 parts) and dimethyl sulphoxide (1 to 3 parts preferably 2 parts). A preferred curing procedure for vaporization of solvent after coating requires heating at 100° C.±20° C. for 45 to 90 minutes followed by heating at 160° C.±20° C. for 90 to 180 minutes.